(12) United States Patent
Singer (10) Patent No.: US 11,592,283 B2
(45) Date of Patent: Feb. 28, 2023

(54) WEARABLE LASER DISTANCE INDICATOR FOR INFECTION CONTROL

(71) Applicant: Leili E. Singer, Chestnut Hill, MA (US)

(72) Inventor: Leili E. Singer, Chestnut Hill, MA (US)

(*) Notice: Subject to any disclaimer, the term of this patent is extended or adjusted under 35 U.S.C. 154(b) by 413 days.

(21) Appl. No.: 17/064,091

(22) Filed: Oct. 6, 2020

(65) Prior Publication Data

US 2022/0107171 A1 Apr. 7, 2022

(51) Int. Cl.

| | | |
|---|---|---|
| *G01B 11/00* | (2006.01) | |
| *G01B 11/14* | (2006.01) | |
| *A42B 1/206* | (2021.01) | |
| *G03B 21/20* | (2006.01) | |
| *H01S 3/00* | (2006.01) | |
| *G02B 5/00* | (2006.01) | |
| *A42B 1/008* | (2021.01) | |

(52) U.S. Cl.
CPC .............. *G01B 11/14* (2013.01); *A42B 1/008* (2013.01); *A42B 1/206* (2013.01); *G02B 5/001* (2013.01); *G03B 21/2033* (2013.01); *H01S 3/005* (2013.01)

(58) Field of Classification Search
CPC ........ G01B 11/14; G02B 5/001; G02B 7/002; G03B 21/2033; A42B 1/24; A42B 1/206
See application file for complete search history.

(56) References Cited

U.S. PATENT DOCUMENTS

| | | | |
|---|---|---|---|
| 10,948,287 B1 * | 3/2021 | Grant | G01P 13/00 |
| 2002/0159249 A1 * | 10/2002 | Mickey | A42B 1/244 |
| | | | 362/186 |
| 2014/0268683 A1 * | 9/2014 | Waters | A42B 1/244 |
| | | | 362/106 |
| 2015/0063777 A1 * | 3/2015 | Letke | H04N 23/56 |
| | | | 386/224 |
| 2018/0100646 A1 * | 4/2018 | Sullivan | A41F 9/002 |
| 2021/0319675 A1 * | 10/2021 | Bitetto | G06V 40/103 |
| 2021/0392961 A1 * | 12/2021 | Shallit | A41D 3/00 |

* cited by examiner

*Primary Examiner* — Gerald J Sufleta, II
(74) *Attorney, Agent, or Firm* — Wolf, Greenfield & Sacks, P.C.

(57) ABSTRACT

Provided herein are wearable laser devices that provide an intuitive visual indication of a fixed radius around the wearer. Some embodiments include optical detectors that detect when two or more persons are in proximity with one another. The wearable laser devices may be used in a variety of applications, including, but not limited to, infection control, sports and entertainment.

13 Claims, 8 Drawing Sheets

WEARABLE LASER DISTANCE INDICATOR FOR INFECTION CONTROL

FIELD

Aspects described herein generally relate to the field of wearable laser devices.

BACKGROUND

In response to the coronavirus pandemic, public health officials have recommended, and many governments have required, that certain persons, e.g., persons from different households, maintain a minimum distance from one another, e.g., 6 feet (~1.8 m). This rule is easy to understand in theory but may be difficult to implement in practice. Many people do not reliably estimate their distances from others; others become distracted or are simply inattentive. These problems are especially present in children and are of substantial concern where many children are gathered, e.g., at a school or place of public recreation.

SUMMARY

Some embodiments of the present invention are directed to a device to be worn on a person's head. The device comprises a laser unit, which projects onto the floor a ring-shaped (annular) image of a desired outer radius (e.g., 6 feet) and is centered substantially on the wearer in the horizontal plane. This image provides an intuitive visible indicator of a minimal safe distance from the wearer.

Because the wearer's body and head move and rotate in three dimensions, projecting a ring-shaped (annular) image that is centered substantially on the wearer in the horizontal plane is not a trivial problem. To address this problem, some embodiments of the present invention comprise a wearable laser device wherein an axicon-equipped laser unit is freely suspended from the apex of a specially modified conical hat. As shown below, the use of a truncated conical base and an apical support is crucial to solving several problems the inventor encountered in designing the device.

In one embodiment, the device comprises: a hat that is conical in shape, wherein the hat comprises a main portion that is a truncated cone with circular apertures at its apex and base, and a conical apical support that is affixed to the apex of the main portion and extends in the apical direction; a laser unit freely suspended from the apical support, wherein the laser unit comprises a laser emitter and an axicon optic; and a power source.

In some embodiments, the main portion of the hat, apical support, and laser unit are arranged so that the ring-shaped (annular) laser beam points substantially downward, i.e., substantially plumb, independent of the wearer's normal head movements. The arrangement is described in more detail hereunder.

The conical shape simultaneously solves several engineering problems encountered by the inventor. Unlike other hat designs, the cone does not interfere with the path of the laser beam from the apex of the hat to the floor. The conical shape elevates the source of the laser beam so that the beam is not blocked by the wearer's head. The conical shape also provides necessary space for pendular excursion (swinging) of the laser unit inside the hat. At the same time, in some embodiments, the cone beneficially limits motion of the laser unit to a reasonable range (e.g., 30 degrees in any direction) to avoid damage or wear to the device. The conical shape is especially well adapted to support the weight of other components without buckling. The conical shape provides ample internal space that is suitable to conceal the power source and any other device components.

In some embodiments, the apical support and/or laser unit are adjustable to allow calibration of the radius (i.e., outer radius) of the annular image.

In some embodiments, the invention further comprises an optical sensor, e.g., a camera with microprocessor. The optical sensor has several uses. First, it can be configured to detect if the outer radius of the annular image is outside of a desired range, which would happen, for example, if the wearer sits down. The optical sensor can be configured to turn off the laser emitter for a period of time in such instances. Second, the optical sensor can be configured to detect the intersection or overlap (such terms used here interchangeably) of two annular images projected on the floor by two inventive devices worn by separate individuals. In this embodiment, the invention can automatically detect when two individuals, each wearing an inventive device, come too close to one another. In such cases the inventive devices can provide a visual and/or audible alarm, e.g., a light emitting diode (LED) and/or siren. In embodiments that comprise an optical sensor and alarm, the upper (apical) portion of the cone provides a prominent place to mount the optical sensor and/or a visual alarm for ideal visibility.

In some embodiments, the invention further comprises a substantially horizontal brim at the base of the conical hat. The brim shields the wearer's eyes from the laser beam. In some embodiments, the cone comprises one or more structural reinforcements, e.g., horizontal circular support ribs, e.g., of plastic material or aluminum. In some embodiments, the invention further comprises a means to fasten the hat onto the wearer's head, e.g., a chin strap, e.g., an elastic.

The cone also finds particular utility for children because it provides a large, visually prominent surface that is useful as an artistic medium. A conical hat is also regarded as a festive shape. These and other features will motivate children to wear the inventive device.

The invention may be more fully understood by reference to the following drawing, detailed description, and claims.

DETAILED DESCRIPTION OF THE INVENTION

In one approach to maintaining a minimum distance from others, people have resorted to wearable articles, e.g., hats or vests, with horizontally oriented protrusions, e.g. of foam or plastic, that extend a fixed distance, e.g., 3 feet (~0.9 m), horizontally from the wearer's body in or more directions. The inventor has appreciated that these wearable articles can be unwieldy. The inventor has also appreciated that they can be unsafe because they can strike other persons, block the wearer's visual field, or cause the wearer to trip and fall. Furthermore, the inventor has appreciated that they can also expose the wearer to ridicule.

Therefore, the inventor has recognized that there is a need for a reliable wearable device that visibly marks a fixed distance from the wearer but overcomes the problems mentioned above.

Aspects described herein relate to a wearable laser device that helps the wearer maintain a minimum specified distance, e.g., 2 m or 6 feet, from other persons. In some embodiments, the wearable laser device may be used for purposes of infection control, however it should be appreciated that the laser device is not limited to such uses. In some embodiments, the wearable laser device may be useful for children, e.g., schoolchildren.

Definitions

As used herein, "annular" and "ring-shaped" are used interchangeably and refer to a shape that is substantially in the form of a geometric annulus, i.e., the area bounded by two concentric circles of unequal radii. The annulus can be further defined as the locus of all points for which $r-t \leq SQRT(x^2+y^2) < r$, where SQRT denotes the square root, x and y are Cartesian coordinates, r is the outer radius of the annulus, and t is the thickness of the annulus. Generally, the annulus is provided herein by a thin laser beam and thus, $r \gg t$, e.g., $r > 100\ t$. Where an "annular image" is described herein, it is contemplated that the image, albeit annular in form, may be discontinuous, e.g., due to partial obstructions to the laser beam, and/or distorted, e.g., due to projections on an uneven surface or movement of the laser emitter with respect to the surface upon which the image is projected.

As used herein with reference to a structure or component, unless otherwise indicated by the context, "apex" and "apical" mean "upper" and refer to an inventive device in its normal working orientation, as depicted in the drawings, where the top of the drawing is uppermost. As used herein with reference to a structure or component, unless otherwise indicated by the context, "base" and "basal" mean "lower" and refer to an inventive device in its normal working orientation, as depicted in the drawings, where the bottom of the drawing is lowermost.

As used herein, "axicon" means an optic or system of optics, e.g., a lens or prism or combination of lenses or prisms, that transforms a laser beam into a ring-shaped distribution.

As used herein, "centered substantially" refers to a ring, annulus, or circle, the center of which is substantially under the body of a user or wearer of the inventive device.

As used herein, "floor" and "ground" are used interchangeably and refer to any surface upon which a user or wearer of the inventive device is supported. Unless otherwise denoted, for purposes of this description, the floor or ground is assumed to be flat.

As used herein, "freely suspended" refers to an object that is suspended from one point and free to swing in a pendular fashion in any radial direction with respect to the object's resting pendular state.

As used herein, "normal upright orientation" refers to a device oriented as depicted in the drawings, where the top of the drawing is up.

As used herein, "pendular excursion" refers to a pendular movement of an object.

Throughout this disclosure, "plumb" or "substantially plumb" refers to the direction of suspension. The direction of suspension is defined by two points that are: (1) the point of attachment between the apical support and the suspension cable and (2) the point of attachment between the suspension cable and the laser unit. Where a stationary laser unit is suspended by a stationary apical support, "substantially plumb" is essentially vertical, i.e., toward the center of the earth. For purposes of this disclosure, "substantially plumb" includes not only vertical or essentially vertical, but also the deviations from essentially vertical caused by inertia, wind, etc.

As used herein, a "power source" means a source of electrical current.

When used in reference to an annulus, the term "radius" refers to the outer radius.

As used herein, "substantially circular" includes any closed plane figure, all points of which can fit within an annular zone defined by a larger circle of radius 1.25 z and an inner circle of radius 0.75 z, where z is any positive number. "Substantially circular" therefore includes closed plane figures that are one or more of the following: circular, elliptical, irregular curvilinear, regular polygonal, irregular polygonal, irregular, or a superposition or combination of the foregoing.

Technical Description of the Device

Some embodiments described herein relate to a wearable laser device that projects a luminous ring (annulus) of a substantially fixed radius around the body of the person who wears the device, i.e., the wearer. The ring is projected on the surface where the wearer stands, e.g., the floor or ground. Given the stature of the wearer, the device can be configured to project a ring of any desired radius, e.g., 6 feet, when the wearer is standing upright. The device is useful for infection control, e.g., to provide an intuitive visual indicator so that the wearer and other person(s) can maintain a minimum distance apart from one another. The device can also be adapted for other purposes, for example, for use in sports and entertainment. For example, the devices can be used as an alternative to tackling or tag in contact sports; to provide visual effects for dance performances and in discotheques; and to help members of a band, dance troupe, or cheerleaders maintain a formation, either in rehearsal or in live performance.

In some embodiments, the device includes a hat that is approximately conical in shape. The hat comprises an axicon-equipped laser unit that may be freely suspended from the apex of the hat.

Figure 1:
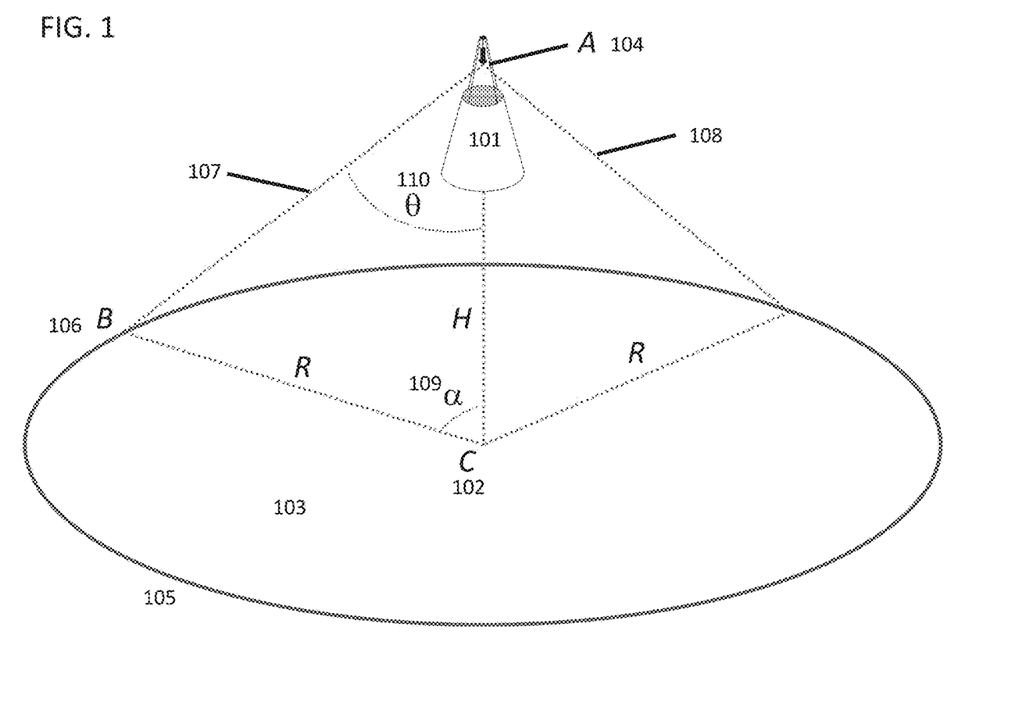
FIG. 1 is a diagram showing the geometric relations of an exemplary laser device, laser beam, and resultant image.

FIG. 1 shows certain geometrical aspects of one embodiment of the device and its operation. The device 101 is positioned at a height H directly over a point C (102) on a flat surface 103. Device 101 emits an annular laser beam from a point A (104) and projects an annular image 105 on flat surface 103. The annular image is centered on point C (102) and has a radius of approximately R. Thus, the annular image can be approximately described as the locus of all points, e.g., point B (106) having a radius of approximately R from point C (102); here it is stated "approximately" R because the annulus has a finite thickness, within the range of which R will vary. The annular beam can thus be described as the locus of all rays, e.g., rays 107 and 108, that extend from point A to any one point on annular image 105. In this example, each such ray is one side of a right triangle ABC where the angle α (109) is a right angle. Note that angle θ (110) is large enough to ensure that all or most of the rays, e.g., ray 107, remain uninterrupted by (e.g. are not blocked by) any part of device 101 when the device is in its normal upright orientation. In some embodiments, the axicon may provide an image wherein t is constant and $R_0$ is proportional to distance, i.e., the distance of line segment AC in FIG. 1.

Figure 2:
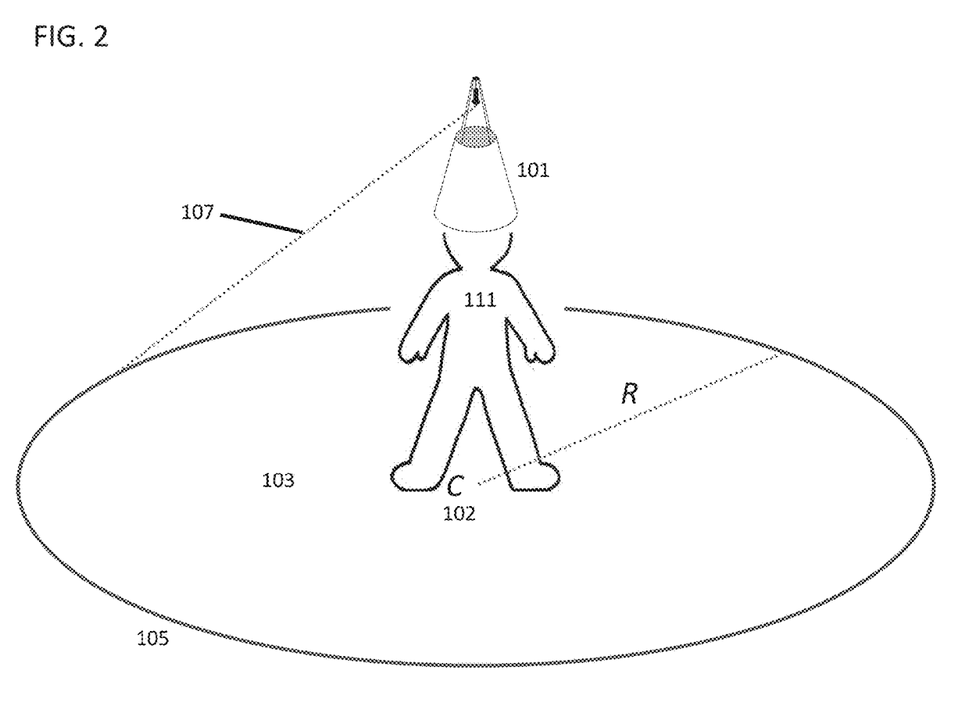
FIG. 2 is a diagram showing the geometric relations of the wearer in relation to an exemplary laser device, laser beam, and resultant image.

FIG. 2 shows the device of FIG. 1 worn by a person, i.e., wearer 111. Wearer 111 stands upright and directly over point C 102. Device 101 emits an annular beam shown, e.g., by ray 107, which projects an annular image 105 onto flat surface 103. Annular image 105 provides an intuitive and visually conspicuous indicator of the distance R that wearer 111 should maintain from other persons (and which such other person should maintain from the wearer), e.g., for purposes of infection control, or for other applications.

Figure 3:
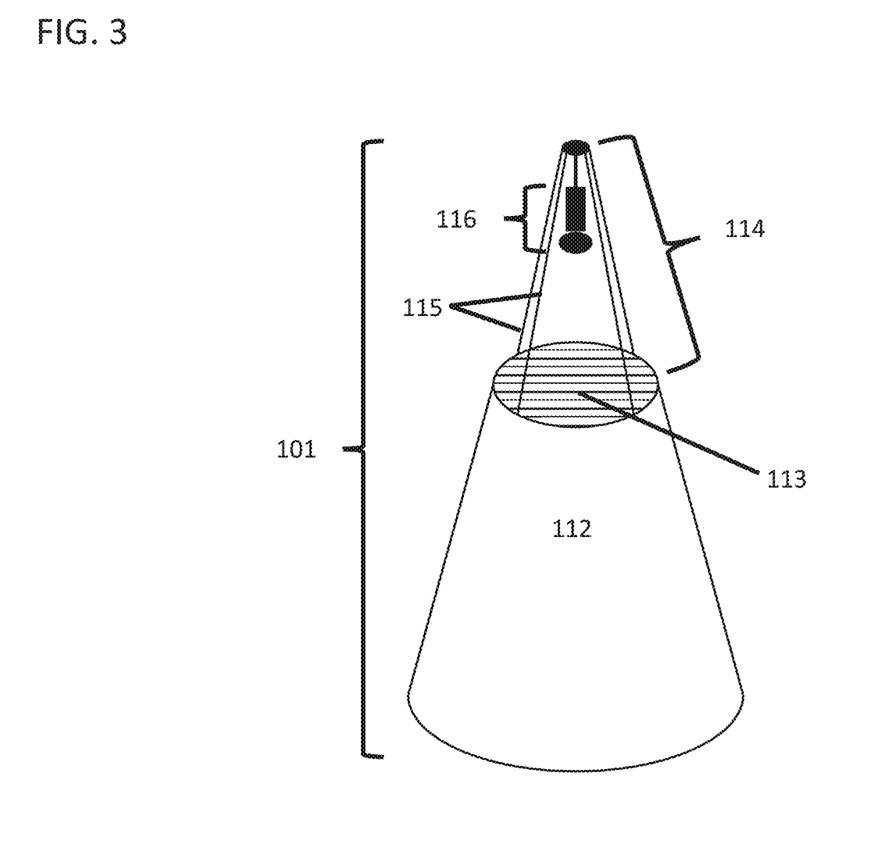
FIG. 3 is a top perspective view of an exemplary laser device.

FIG. 3 is a top perspective view of an embodiment of a laser device 101. The device comprises a main portion 112 that may comprise substantially a truncated cone having an apical aperture 113 that is substantially circular in shape and a basal aperture (not shown in FIG. 3; see FIG. 4 for basal aperture 117). Affixed to the main body 112 is an apical support 114 that may comprise, for example, several struts 115. A laser unit 116 may be freely suspended from the apical support.

Figure 4:
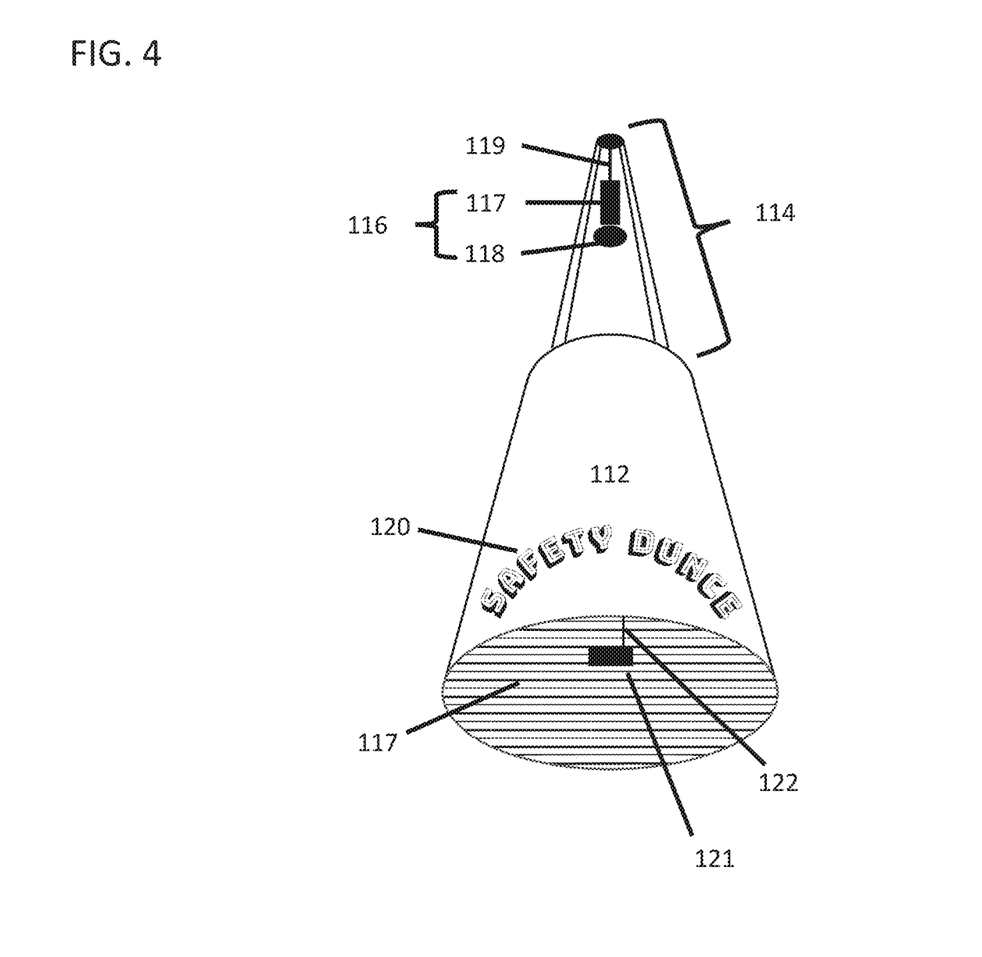
FIG. 4 is a bottom-up perspective view of an exemplary laser device.

FIG. 4 is a bottom perspective view of the embodiment of the laser device shown in FIG. 3. The main portion 112 may include a basal aperture 117 that may be substantially circular in shape and adapted to fit comfortably on a human head. Affixed to the main body 112 is an apical support 114. The laser unit 116 comprises a laser emitter 117 and an axicon 118. The laser unit 116 may be freely suspended from apical support 114 by means of a cable 119. The main portion 112 may provide a surface that is suitable for artistic adornment 120. The device comprises a power supply 121 which may power the laser unit 117 via an electric cable 122 (entire length of cable not shown), wirelessly, or by any other suitable arrangement. In the embodiment shown in FIG. 4, the cable 119 is continuous with the cable 121; thus cable 119 may serve dual purposes: to suspend laser unit 116 from apical support 114 and to conduct electricity between power supply 121 and laser emitter 117. In other embodiments, however, the laser unit may be suspended from the apical support via a connector that is distinct from a power-transmitting cable, such as a cord or wire.

Figure 5:
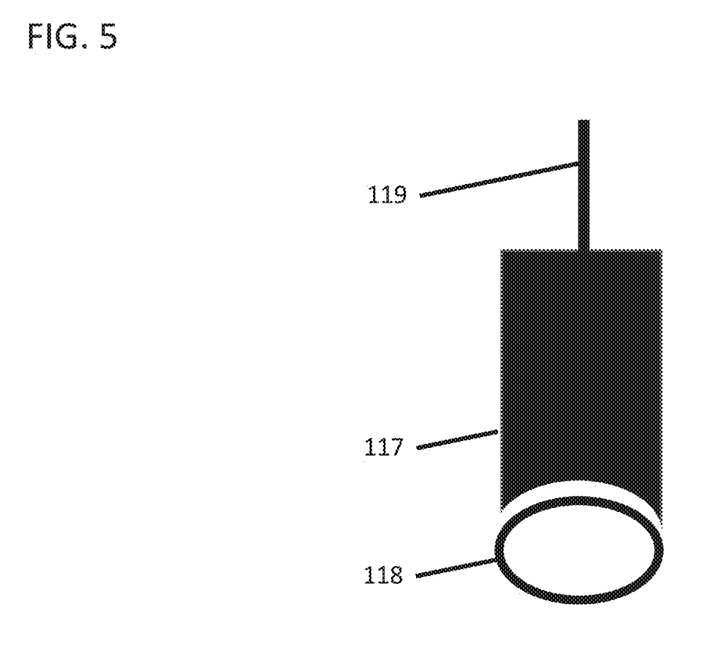
FIG. 5 is a view of the laser unit of an exemplary laser device.

FIG. 5 is a front view of an exemplary laser unit. Laser emitter 117 may be placed in a fixed position with respect to axicon 118 so that the laser unit 117 emits an annular beam. Power to the laser emitter is provided by electric cable 119, which can, in some embodiments, also serve to suspend the laser unit from apical support of the device (see FIG. 4).

Figure 6:
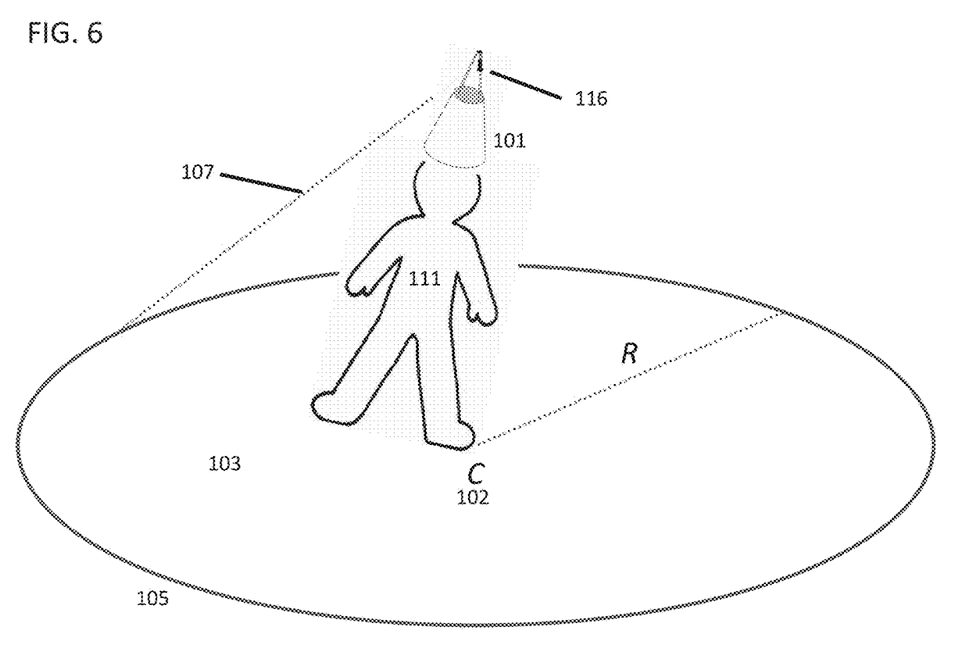
FIG. 6 is a diagram showing the geometric relations of a wearer, whose head is tilted with respect to the horizontal axis, in relation to an exemplary laser device, laser beam, and resultant image.

FIG. 6 shows the device of FIG. 1 worn by a person, i.e., wearer 111. In this illustration, the wearer 111 stands over point C 102 but does not stand upright, i.e., the wearer's body axis and head are tilted with respect to the vertical axis. Despite the tilt of the wearer's body and head, the laser unit 116 may remain substantially plumb because the laser unit 116 is freely suspended. As a result, device 101 emits an annular beam shown, e.g., by ray 107, which projects an annular image 105 onto flat surface 103.

Figure 7:
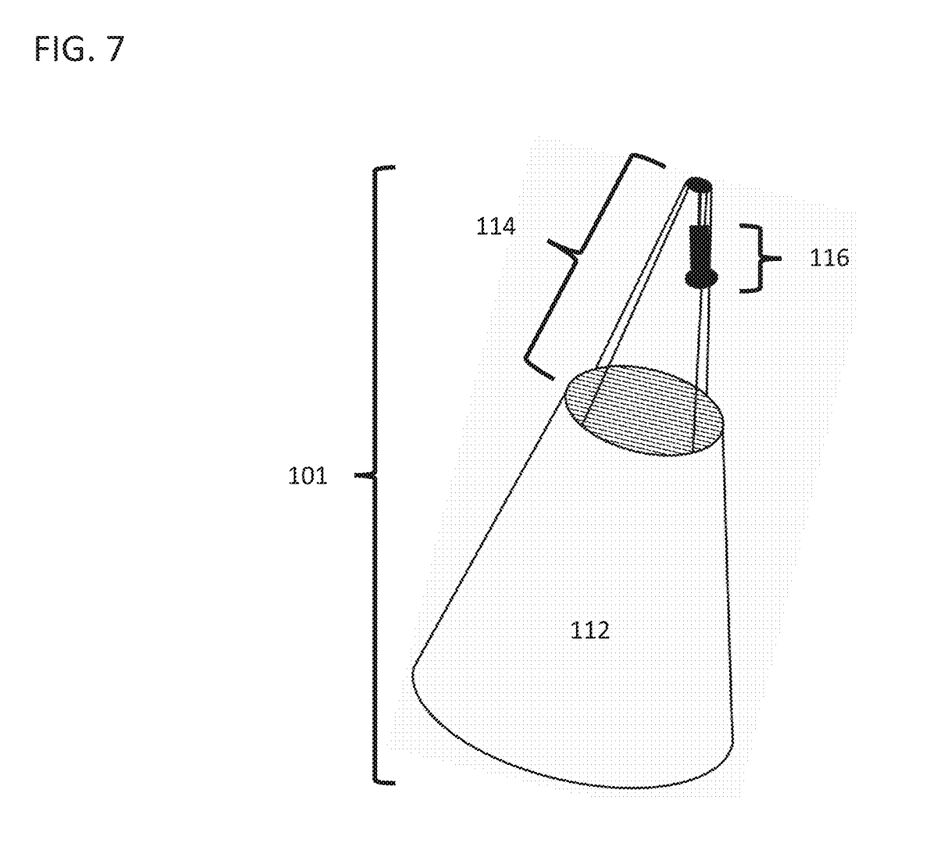
FIG. 7 is a top-down perspective view of an exemplary laser device that is tilted with respect to the horizontal axis.

FIG. 7 shows the device of FIG. 6 in further detail. If the wearer's head is tilted as shown in FIG. 6, the main portion 112 of the device 101 is likewise tilted. Free suspension of the laser unit 116 from apical support 114 compensates for the tilt of the wearer's head and the main portion 112 insofar as the laser unit 116 remains vertical.

Figure 8:
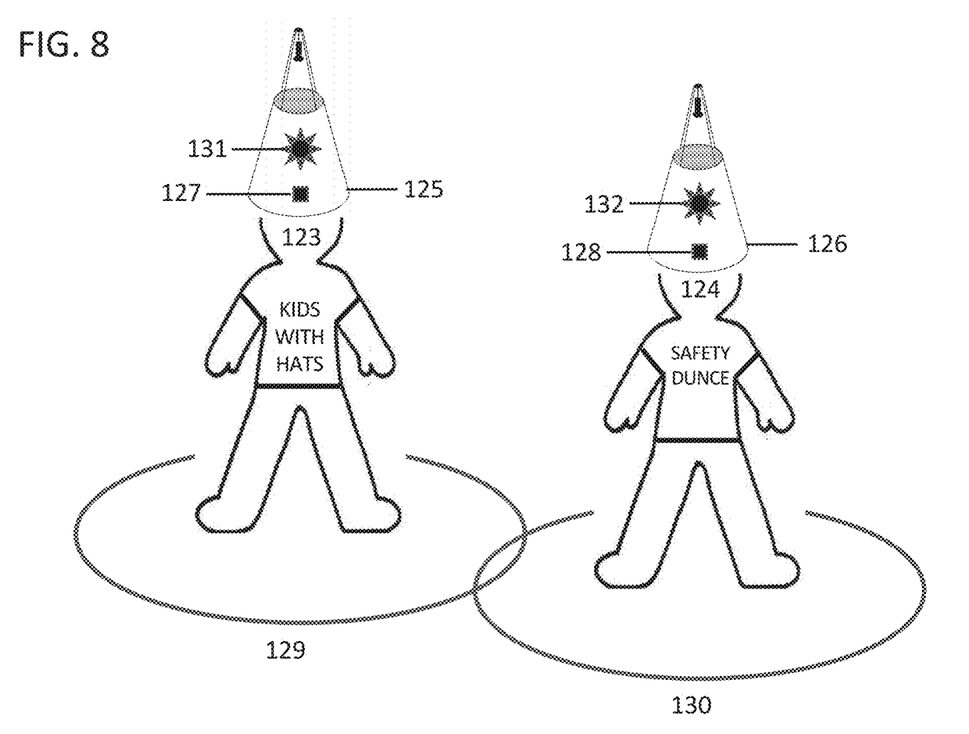
FIG. 8 depicts a system, wherein each of two persons wear an exemplary laser device, and each device is configured to determine when the two persons are in undesirably close proximity.

FIG. 8 shows a system wherein two children 123 and 124 each wear an inventive device (125 and 126, respectively). Each device includes an optical sensor (127 and 128, respectively) configured to detect when the annular image (e.g., 129) projected by that device intersects or overlaps with the annular image (e.g., 130) projected by the other device. When the optical sensor detects such intersection or overlap, a visual alarm (131 and 132), e.g., a light-emitting diode, is turned on, indicating to each child and bystanders (e.g., parents, teachers, supervisors) that the children have come into unacceptably close proximity. If desired, alarms 131 and 132 can be outfitted with a means to provide an audio alarm, e.g., a piezo twitter or speaker.

Thus, in one embodiment, the device comprises: a hat that is conical in shape wherein the hat comprises a main portion that is a truncated cone with circular apertures at its apex and base, and a conical apical support that is affixed to the apex of the main portion and extends in the apical direction; a laser unit freely suspended from the apical support, wherein the laser unit comprises a laser emitter and an axicon; and a power source.

In some embodiments, the main portion of the hat, apical support, and laser unit are arranged so that the ring-shaped (annular) laser beam points substantially downward, i.e., plumb, independent of the wearer's normal head movements (see FIGS. 6 and 7).

When the components are properly arranged and the device is worn on a person's head, the laser unit projects onto the floor a ring-shaped (annular) image that has a chosen radius (e.g., 6 feet) and is centered substantially on the wearer in the horizontal plane. This ring provides an intuitive visible indication of a minimal safe distance from the wearer.

In some embodiments, the hat has a conical shape, which may help to avoid interference of the hat with the path of the laser beam from the apex of the hat to the floor. In some embodiments, the conical shape may elevate the source of the laser beam so that the beam is not blocked by the wearer's head. The conical shape may also provide space for excursion (swinging) of the laser unit inside the hat. The conical shape may also help to limit motion of the laser unit to a reasonable range (e.g., 30 degrees in any direction) to avoid damage or wear to the device. The conical shape is especially well adapted to support the weight of other components without buckling. The conical shape provides ample internal space that is suitable to conceal the power source and any other device components.

In some embodiments, the invention further comprises an optical sensor, e.g., a camera with microprocessor. In some embodiments, the optical sensor is configured to detect when the radius of the annular image provided by the device is outside of a desired range, e.g., below 90% of the desired radius, which would occur, for example, if the wearer sits down; in such cases, the device can be configured to interrupt power to the laser emitter for a fixed period of time, e.g., 30 seconds, 60 seconds, 5 minutes, or any desired interval. Upon restoring power, the annular image will reappear, and the optical sensor will reevaluate whether the radius of the annular image has returned to the desired range. This provides a repeated control mechanism. For example, in one embodiments, the optical sensor may provide a signal to a microprocessor or other controller, which may then trigger interruption of power to the laser emitter, and may then trigger restoration of power to the laser emitter after a set period of time.

In some embodiments, the optical sensor is configured to detect the intersection or overlap of two circles projected on the floor by two inventive devices worn by separate individuals. In this embodiment, the invention can automatically detect when two individuals, each wearing the inventive device, come too close to one another. In such cases the inventive devices can provide a visual and/or audible alarm, e.g., a light emitting diode (LED) and/or siren. In embodiments that comprise an optical sensor and alarm, the upper (apical) portion of the cone provides a prominent place to mount the optical sensor and/or a visual alarm for ideal visibility.

In some embodiments, the invention further comprises a substantially horizontal brim at the base of the conical hat. The brim shields the wearer's eyes from the laser beam. In some embodiments, the cone comprises one or more structural reinforcements, e.g., horizontal circular support ribs, e.g., of plastic material or aluminum. In some embodiments, the invention further comprises a means to fasten the hat onto the wearer's head, e.g., a chin strap, e.g., an elastic.

In some embodiments, the conical hat may be appealing for children because it provides a large, visually prominent surface that is useful as an artistic medium. A conical hat is also regarded as a festive shape. These and other features may motivate children to wear the device.

In some embodiments, the main portion of the hat can be constructed from any suitable rigid or semirigid material, e.g., plastic or aluminum, and can be covered, combined, or enhanced with other materials, e.g., cloth, for weather resistance, comfort, or aesthetic purposes. In some embodiments, the main portion of the hat may be flexible.

The basal aperture of the hat can be tailored or adapted to fit the head of a wearer comfortably. It can include, for example, an adjustable headband or material suitable for contact with the skin. The basal aperture need not be strictly circular; it can be flexible or deviate from a strictly circular form to accommodate the form of the wearer's head.

In some embodiments, the apical support comprises one or more support members made of suitable rigid or semirigid material, e.g., plastic, aluminum, titanium, or cardboard. Where the apical support comprises struts, preferably three or more struts are used for stability. In some embodiments, if the apical support is not optically clear, the apical support may be configured to interfere only minimally with the projection of the laser beam, e.g., by the use of thin struts. Alternatively, the apical support may be made of an optically clear material, e.g., a clear plastic, e.g., polycarbonate, that is positioned in a way not to interfere with projection of the laser beam. Where the apical support is optically clear, it can be provided in the form of several members, e.g., struts, or substantially in the form of a cone. In some embodiments, where the apical support is made of an optically clear material, the apical support may have a prismatic effect on the radius of the annular image produced by the device. If desired, the prismatic effect can be advantageously used to obtain or modulate the radius of the annular image. In some embodiments, the optically clear apical support will have no prismatic effect.

The laser unit can comprise any suitable laser emitter and axicon. In some embodiments, the laser emitter produces light in the visible spectrum; however, the use of ultraviolet or infrared lasers is also contemplated. For example, in some embodiments, an ultraviolet laser can be used in combination with a floor coated with a fluorescent material that absorbs in the ultraviolet spectrum and emits in the visible spectrum. In some embodiments, an ultraviolet or infrared laser can be used in combination with an optical sensor that detects the image produced by that laser. Axicons are known in the art and can be fashioned from any optically suitable material. In some embodiments, the axicon is a refractive axicon. In some embodiments, the axicon is a diffractive axicon. In some embodiments, the axicon is a reflective axicon. In some embodiments, the axicon is a reflaxicon, i.e., a two-stage axiconic reflector.

The power source can be any suitable source of electric current, e.g., an electrochemical cell or battery, or a photovoltaic cell or system.

The radius of the annular image produced by the device can be calibrated to a wearer's stature. Calibration can be performed, for example, with the main portion level and at rest, and the base of the main portion positioned a calibration distance $D_c$ (e.g., 1 meter) above a flat horizontal surface. Under such conditions, the (1) the axicon and (2) the distance from the axicon to the center of the circular aperture at the base can be selected to project onto the flat horizontal surface a substantially annular image with a specified radius $R_c$, e.g., between about 50 cm and about 300 cm. Thus calibrated, the radius $R_w$ of the annular image produced by the device when worn on a head, can be described as: $R_w = R_c \times (D_w/D_r)$ where $R_w$ is the radius of the annular image when worn on the head; $R_c$ is the radius of the annular image on calibration, $D_w$ is "worn distance", which is the wearer's stature plus the laser source distance $D_s$; and $D_r$ is the "reference distance" which is the calibration distance $D_c$ plus the laser source distance $D_s$. The laser source distance $D_s$ is the distance from the point of laser emission from the axicon (point A in FIG. 1) to the planar center of the planar basal aperture of the main portion. If the basal aperture is not strictly planar, for purposes of this description, the "planar center" can be the centroid of the basal aperture.

Calibration can be accomplished, and a means for calibration can be provided, for example, by varying the height of the apical support, varying the distance between the laser unit and its point of suspension from the apical support, by varying the vertical length of the laser unit, or by selecting and/or positioning of the axicon. Thus, for purposes of calibration or for other purposes, the radius of the annular beam can be controlled by a means to modify the vertical position of the laser unit with respect to the main portion. Such means include extendable apical support(s), e.g., slideably extendable apical supports fixed, e.g., by friction, pins, screws, or a rack and pinion.

CERTAIN EMBODIMENTS OF THE INVENTION

Some exemplary embodiments of the invention are:

Embodiment 1: A wearable device for marking a horizontal radius around a body of a human, the device comprising: a hat suitable to be worn on a human head; a laser unit affixed to the hat comprising a laser emitter and an axicon, wherein the laser unit is configured to project an annular beam; and a power supply.

Embodiment 2: The device of embodiment 1, further comprising an apical support attached to the hat and extending upward, wherein the laser unit is attached to the apical support.

Embodiment 3: The device of embodiment 1, further comprising an apical support attached to the hat and extending upward, wherein the laser unit is suspended from the apical support.

Embodiment 4: The device of embodiment 1, further comprising an apical support attached to the hat and extending upward, wherein the laser unit is freely suspended from the apical support.

Embodiment 5: A wearable device for marking a horizontal radius around a body of a human, the device comprising:

a main portion substantially in the form of a truncated cone having a substantially circular aperture at its apex and a substantially circular aperture at its base, wherein the aperture at the base is adapted to rest on the head of the human;

an apical support that is attached to the main portion and extends in the apical direction; a laser unit comprising a laser emitter and an axicon, wherein:

the axicon is arranged with reference to the laser emitter so that the laser unit projects an annular beam;

the laser unit is freely suspended from the apical support such that, when the main portion is level and at rest, the main portion does not block the projection of the annular beam; and a power supply that is connected to the laser emitter by an electric cable.

Embodiment 6: The device of embodiment 5, wherein, when the main portion is level and at rest, and the lowest portion of the main portion is positioned 1 meter above a flat horizontal surface, the device projects onto the horizontal surface a substantially annular image with a radius between about 50 cm and about 300 cm.

Embodiment 7: The device of embodiment 5, wherein, when the device is level and worn on the head of a human of stature between 60 cm and 200 cm, inclusive, the device projects a substantially annular image with a radius of between 90 and 185 cm, inclusive.

Embodiment 8: The device of any one of embodiments 1-7, further comprising a means to modify the vertical position of the laser unit with respect to the main portion, whereby the radius of the annular beam can be controlled.

Embodiment 9: The device of any one of embodiments 1-8, further comprising an optical sensor, wherein the optical sensor comprises at least one camera and a microprocessor, wherein the at least one camera is oriented toward the floor and configured to detect the diameter of the annular image.

Embodiment 10: The device of embodiment 9, wherein, if the microprocessor determines that the diameter of the annular image is outside of a preset range, the microprocessor is configured to inactivate the laser emitter for fixed period of time.

Embodiment 11: The device any one of embodiments 1-10, further comprising an optical sensor, wherein the optical sensor comprises at least one camera and a microprocessor, wherein the at least one camera is oriented toward the floor and configured to detect the overlapping of at least a portion of the annular image produced by the device with at least a portion of a second annular image produced by a second device.

Embodiment 12: The device of embodiment 11, further comprising a light attached to the hat and connected to the optical sensor, wherein the light is configured to illuminate upon said detection of said overlapping.

Embodiment 13: The device of any one of embodiments 1-12, further comprising one or more circular support ribs.

Embodiment 14: The device of any one of embodiments 1-13, further comprising a means to secure the device to the head.

Embodiment 15: The device of any one of embodiments 1-14, further comprising a brim.

Embodiment 16: The device of any one of embodiments 1-15, wherein the power supply is an electrochemical cell.

Embodiment 17: The device of any one of embodiments 1-16, wherein the power supply is a photovoltaic cell.

Embodiment 18: The device of any one of embodiments 1-17, wherein the laser emitter emits a red laser.

Embodiment 19: The device of any one of embodiments 1-17, wherein the laser emitter emits a green laser.

Embodiment 20: The device of any one of embodiments 1-17, wherein the laser emitter emits an ultraviolet laser.

Embodiment 21: The device of any one of embodiments 1-17, wherein the laser emitter emits an infrared laser.

Embodiment 22: A system comprising two or more devices made according to any one of embodiments 11-12, wherein said each of said devices is for use by a different person.

Embodiment 23: The system of embodiment 22, wherein at least two of said devices emit laser beams of different wavelengths.

EXAMPLES

Example 1

A child is provided with an inventive laser device substantially as shown in FIG. 3 and FIG. 4. The device is adapted to fit comfortably to the child's head and, based on the child's stature, calibrated to project a ring-shaped image with a 6-foot radius when the child stands upright, wherein the image is substantially centered around the child. The child dons the device on the head and wears it in school. Although the child moves his or her head, the ring-shaped image remains substantially centered around the child. Because of the visual indications provided by the ring-shaped image, the child successfully maintains a distance of at least 6 feet from other people throughout the school day for purposes of infection control.

Example 2

Two inventive devices made according to Example 1 each emit a visible red laser beam with a wavelength of 650 nm. The devices are calibrated such that, when worn by a particular individual, each projects onto the floor a ring-shaped image having a radius of 3 feet (~0.9 m). Each of the devices is further equipped with an optical sensor and an alarm light. Each optical sensor comprises three cameras, which are placed on the exterior of main portion of the respective device such that they have a substantially 360-degree field of view of the floor. Each alarm light is mounted on the front of the main portion of the respective device. The microprocessor of each optical sensor is configured to detect the intersection of any respective portions of two ring-like images with a wavelength of 650 nm and, if such intersection is detected, to illuminate the alarm light. The arrangement in this example can be further understood by reference to FIG. 8. Two children don the inventive devices on their heads. When the children come within 6 feet (~1.8 m) of each other, the ring-shaped images intersect, the optical sensors on each device detect this intersection, and the alarm lights on each device illuminate for purposes of infection control.

The invention claimed is:

1. A wearable device for marking a horizontal radius around a body of a human, the device comprising:
   a main portion having a first end comprising a base that is configured to rest on the head of the human, and a second end opposite the first end, the first end facing a first direction and the second end facing a second direction;
   a support that is attached to the main portion and extends in the second direction;
   a laser unit comprising a laser emitter and an axicon, wherein:
   the axicon is at a position relative to the laser emitter so that the laser unit projects an annular beam;
   the laser unit is coupled to the support such that, when the main portion is level and at rest, the projection of the annular beam is uninterrupted by the main portion; and
   a power supply that powers the laser emitter;
   wherein, when the main portion is level and at rest, and the first end of the main portion is positioned 1 meter above a flat horizontal surface, the laser unit projects onto the horizontal surface an annular image with a radius between about 50 cm and about 300 cm.

2. The device of claim 1, wherein, when the device is level and worn on the head of a human of stature between 60 cm and 200 cm, inclusive, the laser unit projects a substantially annular image with a radius of between 90 and 185 cm, inclusive.

3. The device of claim 2, wherein the main portion is in the form of a truncated cone.

4. The device of claim 3, wherein the laser unit is freely suspended from the support.

5. The device of claim 4, further comprising a means to modify the vertical position of the laser unit with respect to the main portion, whereby the radius of the annular beam can be controlled.

6. The device of claim 5, further comprising an optical sensor, wherein the optical sensor comprises a camera and a microprocessor, wherein the camera is oriented toward the floor and configured to detect the diameter of the annular image.

7. The device of claim 6, wherein, if the microprocessor determines that the diameter of the annular image is outside of a preset range, the microprocessor is configured to inactivate the laser emitter for a fixed period of time.

8. The device of claim 5, further comprising an optical sensor, wherein the optical sensor comprises a camera and a microprocessor, wherein the camera is oriented toward the floor when the device is level and worn on the head of a human and is configured to detect an overlap of at least a portion of the annular image produced by the device with at least a portion of a second annular image produced by a second device.

9. The device of claim 8, further comprising a light attached to the hat and connected to the optical sensor, wherein the light is configured to illuminate upon said detection of said overlap.

10. The device of claim 1, further comprising one or more circular support ribs.

11. The device of claim 1, further comprising a means to secure the device to the head.

12. The device of claim 1, wherein the power supply is an electrochemical cell.

13. The device of claim 1, wherein the power supply is a photovoltaic cell.

* * * * *